United States Patent
Higelin et al.

(10) Patent No.: US 9,486,863 B2
(45) Date of Patent: Nov. 8, 2016

(54) METHOD FOR PRODUCING SLOTS IN A TUBE WALL AND SLOTTING TOOL

(75) Inventors: Michael Higelin, Eislingen / Fils (DE); Daniel Borst, Wolfschlugen (DE)

(73) Assignee: Modine Manufacturing Company, Racine, WI (US)

( * ) Notice: Subject to any disclaimer, the term of this patent is extended or adjusted under 35 U.S.C. 154(b) by 312 days.

(21) Appl. No.: 14/003,419

(22) PCT Filed: Feb. 16, 2012

(86) PCT No.: PCT/EP2012/000681
§ 371 (c)(1),
(2), (4) Date: Sep. 5, 2013

(87) PCT Pub. No.: WO2012/119697
PCT Pub. Date: Sep. 13, 2012

(65) Prior Publication Data
US 2013/0333537 A1    Dec. 19, 2013

(30) Foreign Application Priority Data
Mar. 5, 2011    (DE) .......................... 10 2011 013 209

(51) Int. Cl.
*B23D 3/00*    (2006.01)
*B21D 28/28*    (2006.01)
(Continued)

(52) U.S. Cl.
CPC ................. *B23D 3/00* (2013.01); *B21D 28/28* (2013.01); *B21D 53/02* (2013.01); *F28F 9/02* (2013.01);
(Continued)

(58) Field of Classification Search
CPC ........ B23D 3/00; B21D 28/28; B21D 28/34; B21D 53/02; F25F 2255/12; F28F 9/0243; F28F 9/02; Y10T 83/384; Y10T 83/0596
USPC .......................... 83/178–195, 518, 54; 29/432
See application file for complete search history.

(56) References Cited

U.S. PATENT DOCUMENTS 1,507,291 A    9/1924    Jones
1,728,136 A    3/1929    Power
(Continued)

FOREIGN PATENT DOCUMENTS

CN    101642790    2/2010
CN    102125954    7/2011
(Continued)

OTHER PUBLICATIONS

German Patent Office Action for Application No. 102012014096.7 dated Feb. 21, 2013 (10 pages).
(Continued)

*Primary Examiner* — Omar Flores Sanchez
(74) *Attorney, Agent, or Firm* — Michael Best & Friedrich LLP

(57) ABSTRACT

The invention relates to a method for producing slots (11) in a tube wall (10), wherein a single die plate (2) provided with notches (20) is pushed into the tube (1) and punches (5) arranged in a row pierce the tube wall from the outside and in the process produce the slots (10), whereupon the die plate (2) is rotated about its longitudinal axis out of a working position and into a withdrawal position and is pulled out of the tube (1). Economical production of the slots in tubes having different cross-sectional shapes is achieved according to the invention in that during the slotting operation the tube wall (30) is gripped from the outside and held and is stabilized from the inside against two opposing support strips (25) by way of the die plate (2). A slotting tool according to the invention is characterized in that a supporting tool (6) engages around the circumference of the tube (1) and in that the die plate (2), as seen in the cross-sectional direction (radial direction), has two narrow sides (21) which are arranged at opposite ends of a longest cross-sectional extent (22) of the die plate (2), wherein the die plate (2) has two axially extending support strips (25) between the narrow sides (21) and the inner side of the tube wall (10).

20 Claims, 4 Drawing Sheets

(51) Int. Cl.
*B21D 53/02* (2006.01)
*F28F 9/02* (2006.01)

(52) U.S. Cl.
CPC .......... *F28F 9/0243* (2013.01); *F28F 2255/12* (2013.01); *Y10T 83/0596* (2015.04); *Y10T 83/384* (2015.04)

(56) References Cited

U.S. PATENT DOCUMENTS

| | | | |
|---|---|---|---|
| 1,787,358 A | | 12/1930 | Clay |
| 2,325,437 A | * | 7/1943 | Temple .................. B21D 28/28 83/194 |
| 2,983,167 A | * | 5/1961 | Huet ..................... B21C 37/292 29/33 R |
| 3,259,003 A | | 7/1966 | Griffin |
| 3,848,497 A | * | 11/1974 | Lancaster ............. B21D 28/28 83/124 |
| 4,679,289 A | | 7/1987 | Miller |
| 5,088,193 A | | 2/1992 | Okada et al. |
| 5,737,952 A | | 4/1998 | Baumann |
| 6,386,588 B1 | | 5/2002 | Young et al. |
| 6,601,492 B1 | * | 8/2003 | Schusheim ........... B21D 28/28 83/195 |
| 7,146,738 B2 | | 12/2006 | Yu |
| 7,562,609 B2 | * | 7/2009 | Ueno .................... B21D 28/28 72/327 |

FOREIGN PATENT DOCUMENTS

| | | | | |
|---|---|---|---|---|
| CN | 202105901 | | 1/2012 | |
| DE | 2231517 | | 1/1974 | |
| DE | 4334203 A1 | * | 4/1994 | .......... B21C 37/292 |
| DE | 19508177 | | 9/1996 | |
| DE | 4334203 | | 8/2003 | |
| DE | 102006028490 | | 5/2007 | |
| DE | 10103176 | | 6/2010 | |
| DE | 102012014073 | | 8/2013 | |
| DE | 102012014096 | | 9/2013 | |
| EP | 1674170 | | 6/2006 | |
| GB | 561602 | | 5/1944 | |
| GB | 807608 | | 1/1959 | |
| JP | 2002028736 | | 1/2002 | |
| JP | WO 2006095754 A1 | * | 9/2006 | ............ B21D 28/28 |
| WO | 2012119697 | | 9/2012 | |

OTHER PUBLICATIONS

German Patent Office Action for Application No. 102012014073.8 dated Feb. 14, 2013 (4 pages).
International Search Report; PCT/EP2012/000681; Jun. 4, 2012.
First Office Action from The State Intellectual Property Office of the People's Republic of China for Application No. 201310292481.3 dated Nov. 3, 2015 (16 pages).
English translation of the Notification of the Second Office Action from the State Intellectual Property Office of the People's Republic of China for Application No. 201310292481.3 dated Jun. 28, 2016 (8 pages).

* cited by examiner

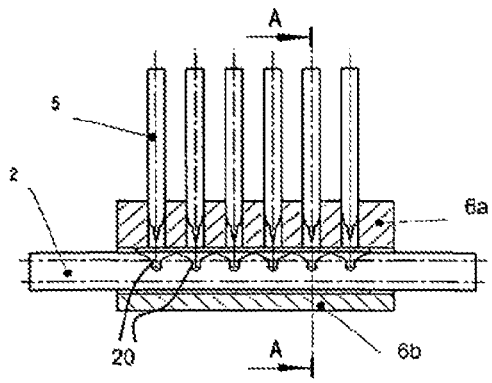
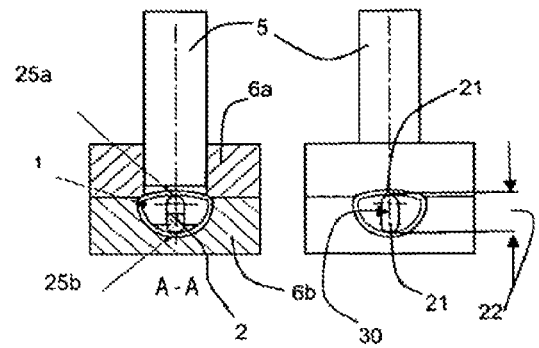
Fig. 1a  Fig. 1b  Fig. 1c
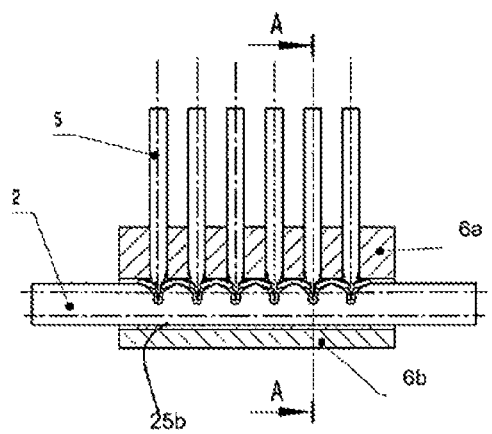
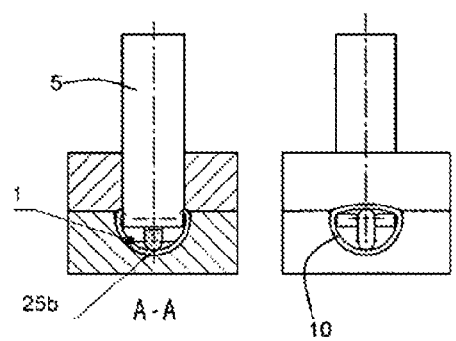
Fig. 2a  Fig. 2b  Fig. 2c
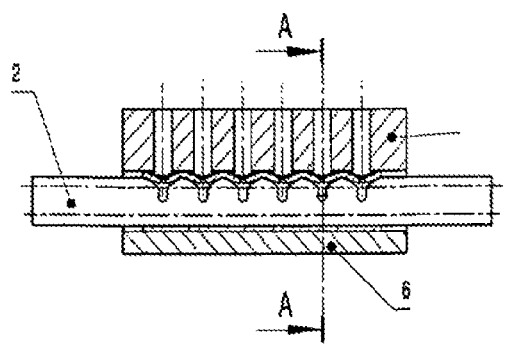
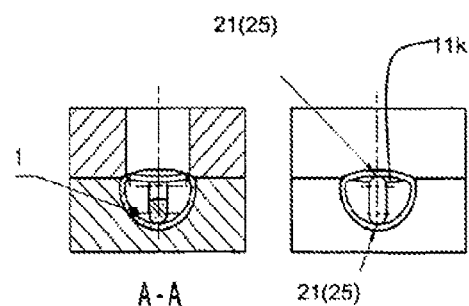
Fig. 3a  Fig. 3b  Fig. 3c

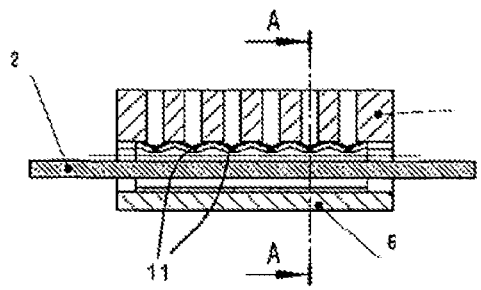 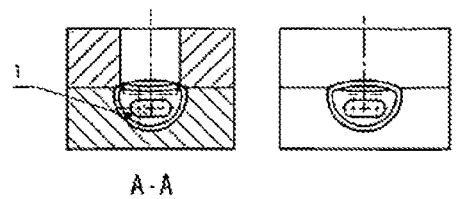 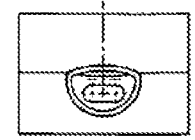
Fig. 4a  Fig. 4b  Fig. 4c
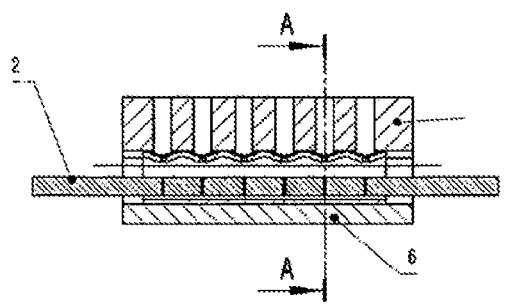 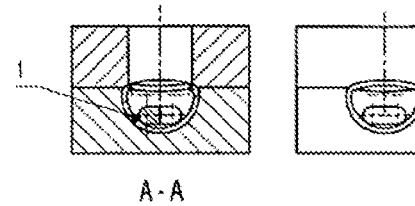 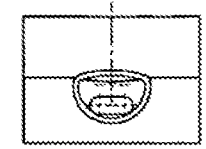
Fig. 5a  Fig. 5b  Fig. 5c
Fig. 6a  Fig. 6b  Fig. 6c  Fig. 6d
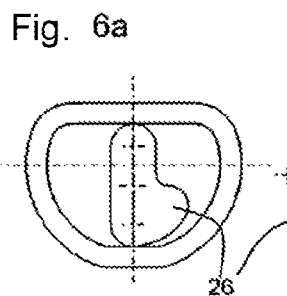 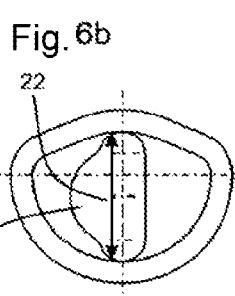 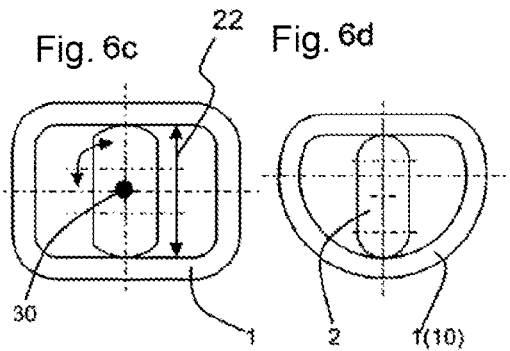
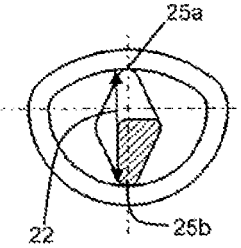 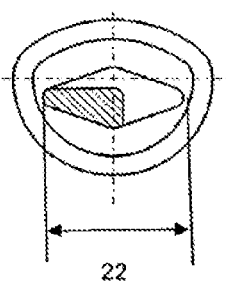 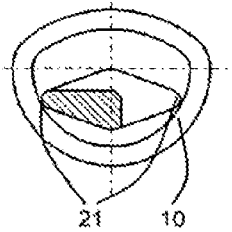
Fig. 6e  Fig. 6f  Fig. 6g

Fig. 7a
Fig. 7b
Fig. 7c
Fig. 7d
FIG. 8
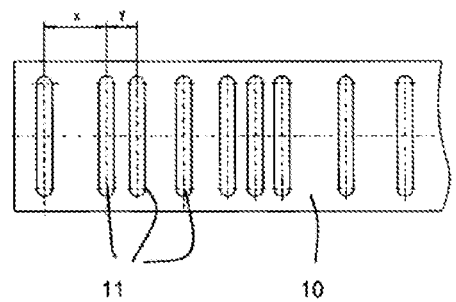

METHOD FOR PRODUCING SLOTS IN A TUBE WALL AND SLOTTING TOOL

The invention relates to a method for producing slots in a tube wall and to a slotting tool, wherein a die is pushed into the tube and punches arranged in a row pierce the tube wall from the outside and in the process create the slots.

BACKGROUND

A production method of the type described in the preamble is known from DE 4 334 203 C2. In said patent, there are embodiments with two dies to be introduced into the tube, said dies jointly filling the tube cross section. Using a plurality of dies is complex, both for tool production and for the production of the slots. Other embodiments in said document use only one die, which likewise fills the entire tube cross section, this being inherently more advantageous. For the production of the slots by means of a single die, provision is made for the die to be rotated through 180° from the working position into a retracted position after the formation of the slots, in order that the die can be removed from the tube again. However, realizing large rotational travels can have a negative impact on the cost-effectiveness of the manufacturing process, since longer cycle times may be necessary. In order to be able to realize adequately large collars on the slot edges, the die has axial connecting portions of relatively weak form between its axially arranged supporting portions (connecting portions—see FIG. 7, reference sign 4 in DE 4 334 203 C2). Cracks can therefore form in the die. Furthermore, only round tubes are shown in the publication. However, it is desirable to be able to provide tubes having as wide a variety of cross-sectional shapes as possible with slots.

U.S. Pat. No. 5,088,193 A also relates to the slotting of round tubes and the use of a single inner die. According to said publication, provision is made, firstly, for embossings to be formed in the tube wall with the aid of an arcuate punch corresponding to the contour of the tube. In the tube there is a die, the cross section of which is only slightly smaller than the inner tube cross section. Subsequently, the die is removed from the tube and the slots are produced with the aid of a piercing tool in the embossings created in the first step. A rotary movement of the die is not necessary here, since the latter is in the form of a continuous round bar, that is to say without supporting and connecting portions. There is nevertheless a disadvantage at least with regard to the cost-effectiveness of the manufacturing process.

In the production of slots, as described above, in principle no cuttings are produced as waste, this method differing from other known methods in which holes are cut out and the hole edges are bent in a flange-like manner.

SUMMARY

The invention described below and directed at the production of slots also does not relate to any known methods in which the inside of the tube is subjected to an incompressible medium (liquid) in order to produce the tube slots.

An object of the invention is to provide a production method and a suitable slotting tool which promises somewhat more cost-effective production of slots in tubes with different cross-sectional shapes.

The method for producing slots in a tube wall, wherein a die is pushed into the tube and punches arranged in a row pierce the tube wall from the outside and in the process create the slots, whereupon the die is rotated about its longitudinal axis from a working position into a retracted position and is pulled out of the tube, provides according to the invention for the tube wall to be clasped from the outside and held during the slotting operation and to be stabilized from the inside only against two opposite supporting strips with the die, in the working position of the die.

The slotting tool, having a row of punches for producing slots in a tube wall, and having a die which is introducible into the tube, is provided with notches and is rotatable about its longitudinal axis (axial axis) between a working position and a retracted position, is characterized according to the invention by the arrangement of a support tool for supporting the tube from the outside, said support tool engaging around the periphery of the tube, and in that the die, as seen in the cross-sectional direction (i.e. in the radial direction), has two opposite narrow sides at the ends of its largest cross-sectional extent, wherein, in the working position, the die has or provides two opposite supporting strips, extending in the axial direction, between the narrow sides and the inner side of the tube wall.

In a first embodiment, the cross section of the die differs from an approximately rectangular cross section by way of rounded or pointed or conically formed narrow sides. The formulation is intended also to include cross-sectional shapes which are identical or similar to an oval and also shapes which are similar or identical to a rhombus and further variations which all have in each case a narrow side at the two ends of the largest cross-sectional extent.

Such a configuration allows smaller or shorter rotary movements of the die, specifically at most about 120°, preferably about 70-90°. Therefore, shorter cycle times and/or improved productivity during the production of the slots can be expected.

The expression "supporting strips", which is to be understood primarily in a functional manner, can also be understood to mean, within the meaning of this proposal, a contact strip which does not, however, render the rotation of the die about the longitudinal axis more difficult. This expression is furthermore to be understood as meaning a support which ensures the stabilizing action of the die on the tube, such that the tube shape, apart from small permissible deviations, is retained. Accordingly, the dimension of the largest cross-sectional extent of the die will be slightly smaller than the corresponding internal dimension of the tube. A person skilled in the art will take account of the permissible tolerances of the tubes and will prepare the die accordingly.

In the case of tubes having, for example, an approximately D-shaped or approximately rectangular cross section, provision is made for no contact to be made otherwise—that is to say during the rotary movement of the die—with the inner side of the tube wall.

By contrast, provision is made in the case of approximately round tubes for the die to have two opposite supporting strips with the inner side of the tube wall, even in the retracted position, said opposite supporting strips being offset through no more than about 120° with respect to the position of the supporting strips in the working position.

In connection with the rounded narrow sides, provision is made for the radius of the rounded portions to be smaller than the radius of curvature of the tube in the region of the slots. As a result, the somewhat wider supporting strips are converted into narrow supporting lines which represent a linear support, extending in the axial direction, of the tube wall approximately in the middle of the narrow sides.

A feature which refines the above-described subject matter further is that the die is located in the working position with its largest cross-sectional extent approximately transversely to the slots to be produced.

Provision is made for the notches in the die not to be deeper than up to approximately half of the dimension of the largest cross-sectional extent of the die, as seen in the radial direction. As a result, there is a comparative reduction in the risk of the die breaking.

Provision is further made that, in addition to the rotary movement about the longitudinal axis (axial axis) of the die, at least one additional movement of the die can be carried out. Provision is made, with regard to the additional movement, for this to be a lowering and lifting movement. The aim of these further developments is to be able to provide even more different cross-sectional shapes of the tube with slots. But also to be able to form somewhat longer collars on the slots or on the slot edges.

The invention is described in the following text in exemplary embodiments with reference to the appended drawings.

BRIEF DESCRIPTION OF THE DRAWINGS

FIGS. 1a-1c show the process shortly before the slotting operation.

FIGS. 2a-2c show the process during the slotting operation.

FIGS. 3a-3c are similar to FIGS. 2a-2c—but drawn without a punch.

FIGS. 4a-4c show the process after the rotary movement of the die in the retracted position.

FIGS. 5a-5c show a process after a lowering movement of the die has been executed.

FIGS. 6a-6g show various tube cross sections and die shapes.

FIGS. 7a-7d show sketches of various narrow-side designs.

FIG. 8 shows a sketched view of a row of produced slots.

DETAILED DESCRIPTION

Figure 9:
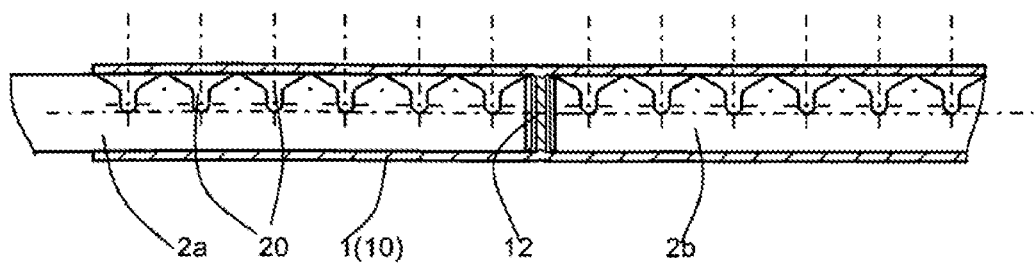
FIG. 9 shows a collecting tube of a heat exchanger having a partition in the collecting tube.

The tubes 1 can be produced for example from an aluminum alloy. The production can take place for example by extrusion or by tube forming from sheet-metal plates and welding along a longitudinal seam.

FIGS. 1a-5c each show a longitudinal section (FIG. 1a etc.), the radial cross section A-A (FIG. 1b etc.) and a side view (FIG. 1c etc.) of the slotting tool. The slotting tool comprises a row of punches 5 (six being shown), a supporting tool 6, which consists in the exemplary embodiments of an upper tool 6a and a lower tool 6b, and a die 2 which is pushed into the tube 1. The supporting tool 6 could also be formed in one part, having a cross section which corresponds to the tube cross section, such that the tube 1 can be pushed into the latter, held and supported. The tube shape is approximately D-shaped, wherein the vertical of the D is curved slightly outwards. The slots 11 are introduced into this curved "vertical". As is shown in the longitudinal sections in FIGS. 1a, 2a and 3a, the die 2 was provided with notches 20 at equidistant spacings which have to correspond to the spacings of the slots 11 to be introduced.

However, FIG. 8 shows that the spacings of the slots 11 can also be determined depending on the purpose, that is to say they do not always have to have the same dimension. The slots 11 also do not have to have the same shape and size, even though only identical slots 11 are shown in FIG. 8.

In FIGS. 1a-3c, the die 2 is located in each case in the working position, a vertical position in the drawing, in which the slots 11 are produced. First of all, the upper tool 6a and lower tool 6b are moved together such that the tube 1 is embraced on all sides from the outside and held. In order to produce the slots 11, the punches 5 are then moved downward through guides (not shown) in the upper tool 6a and pierce the tube wall 10 with their special point configuration, as is shown in FIGS. 2a-2c. In this case, each slot 11 is provided with an inwardly directed, erected collar 11k which can be seen in FIGS. 3a-5c.

FIGS. 4a-5c show the retracted position, a horizontal position of the largest cross-sectional extent 22 of the die 2 in the drawing, in which the slots 11 have already been formed, and the die 2 can be pulled out of the tube 1.

As can be seen from the side views and the sections, the die 2 in FIGS. 1a-5c and in FIG. 6c has a cross section similar to a rectangle, the narrow sides 21 of which are rounded, however. The various cross-sectional shapes, discussed here, of the die 2 are distinguished by the fact that they have the mentioned single largest cross-sectional extent 22, which is immediately apparent when viewing the figures. In FIGS. 1c and 6c, the corresponding reference sign 22 was indicated. Otherwise, the reference signs in FIG. 1 are also applicable for the other figures, where they are not provided. Located at the two opposite ends of the largest cross-sectional extent 22 is in each case a narrow side 21 of the die 2. The two narrow sides 21 ensure the stabilization of the tube wall 10 from the inside, since they provide two opposite supporting strips 25 which extend axially along the tube length. The already discussed notches 20 cause a corresponding interruption of the upper supporting strip 25a in the drawing, whereas the lower supporting strip 25b can extend continuously from the start of the tube to the end of the tube. Further internal supports of the tube 1 are not provided.

A clear distinguishing feature with respect to the prior art described in the introduction is furthermore that preferably less than or not substantially more than about 50% of the cross section of the tube is filled by the cross section of the single die 2, as the figures can show. In DE 4 334 203 C2 and U.S. Pat. No. 5,088,193 A, the entire or virtually entire tube cross section is filled by the die 2.

The hatched part, illustrated in the longitudinal sections and in the cross sections in FIGS. 1a-5c, of the die 2 shows that the notches 20 do not extend into the die 2 substantially further than up to half the greatest cross-sectional extent 22 of the latter. It is then also possible to see therefrom that the die 2, despite cross-sectionally filling the tube to a reduced extent, is more stable than those from the prior art and accordingly will not break so easily. It was not expected that improved stability could be achieved with a die cross section reduced to a comparatively considerable extent.

The inventors have found that the supporting strips 25 can be designed in a considerably narrower manner since tests have shown that the supporting action is retained to a sufficient extent. Wider supporting strips 25 could impair the movability of the die 2 in the tube 1. Therefore, they furthermore propose providing the rounded portions on the narrow sides 21 of the die 2 with a much smaller radius r than the radius of curvature of the tube wall 10. As a result, relatively narrow supporting strips 25, which may be designated as supporting lines 25 since they provide only punctiform or linear contact with the tube wall 10 from the inside, are produced. Accordingly, the enlarged illustration of one narrow side 21 of the die 2 with a detail of the tube wall 10 in FIG. 7a has the narrowest supporting strips 25 with the largest difference in radius. Preferably, the two narrow sides 21 or the associated supporting strips or supporting lines 25 are configured in an identical manner. The provision of supporting lines 25 makes a contribution to realizing smaller rotational-angle movements of the die 2 (see below).

Back to FIGS. 4a-5c, in which, as mentioned, the position of the die 2 in the retracted position can be seen. A comparison of these figures reveals that an additional lowering movement of the die 2 has been carried out in FIGS. 5a-5c. The lowering can also be seen from a comparison of FIGS. 6f and 6g (see below). This measure is appropriate for providing further cross-sectional shapes of the tube 1, as per the proposal, with slots 11.

Possible exemplary cross-sectional shapes of the tubes 1 and the die 2 are shown in the illustrations according to FIGS. 6a-6g. D-shaped and similarly shaped tubes 1 and also an approximately rectangular tube 1 can be seen. The support tool 6 (not shown in FIGS. 6a-6g) should be adapted to the respective cross-sectional shape of the tube 1. FIGS. 6a and 6b show that it is easily possible, for example by way of a bulge 26 of the lower part, in the sketch, of the die 2 (FIG. 6a), to further improve the already discussed stability of the latter. In FIG. 6b, by contrast, a centrally located lateral bulge 26 has been provided. The largest cross-sectional extent 22 is arranged in the vertical direction in FIGS. 6a to 6e, that is to say located in the working position of the die 2. FIGS. 6f and 6g show the retracted position in which the die can be pulled out of the tube 1, while in FIG. 6g, the mentioned lowering of the die 2 has also been carried out. In the lowered position, the two narrow sides 21 of the tube wall can easily come into slight contact without making it more difficult to pull out the die 2. Such slight contact is also present in the case of the slotting (not shown) of approximately round tubes 1. FIGS. 6e to 6g show approximately rhomboidal cross sections of the die 2. The above-discussed dimensions of the radii r have in this case the greatest difference, such that very narrow supporting lines 25 are present.

The movement of the die 2 from the working position into the retracted position and back takes place by way of a reciprocating rotary movement about the longitudinal axis 30, which was marked in FIG. 6c and is about 90° there. The maximum rotation angle is about 120°. Depending on the configuration of the collars 11k or of the slots 11, and also depending on the configuration of the die 2 with the two supporting lines 25, rotation angles of for example 70-90° can be executed and are particularly advantageous.

The slots 11 produced according to the proposal are suitable for accommodating for example flat tube ends (not shown) which can be welded, soldered or fastened in some other way therein. The tube 1 can be a collecting tube and the flat tubes can be the tubes of a heat exchanger.

FIG. 9 shows such a collecting tube 1. A partition 12 was inserted into this collecting tube 1 and fastened to the inside of the tube wall 10. Therefore, in this special case, two of the described dies 2a, 2b are pushed into the collecting tube 1, one from the left-hand side and the other from the right-hand side of the tube 1, said dies 2a, 2b extending as far as close to the partition 12. Then—as described above—the slots 11 are formed in the tube wall 10.

The dies 2a, 2b are then rotated through about 90° about the longitudinal axis 30 and pulled out of the collecting tube 1.

The above-mentioned notches 20 in the die 2 have an upper conical portion and a lower portion adjoining the latter and extending approximately parallel thereto, said portions corresponding to the point configuration of the punch 5. Accordingly, a design similar to a pointed roof is formed in each case in the tube wall 10 between the slots 11, as can be seen from FIGS. 2a-5c. This design ensures high rigidity and stability in the tube wall 10.

What is claimed is:

1. A method for producing slots in a tube wall of a tube, the method comprising:
   providing a die having notches;
   pushing the die into the tube;
   piercing the tube wall from the outside with punches arranged in a row;
   creating the slots by piercing the tube wall from the outside;
   clasping the tube wall from the outside with a support tool while creating the slots;
   stabilizing the tube from the inside against two opposite supporting strips of the die;
   rotating the die about its longitudinal axis from a working position into a retracted position; and
   pulling the die out of the tube.

2. The method as claimed in claim 1, wherein rotating the die includes rotating the die through between about 70 degrees and about 120 degrees prior to pulling the die out of the tube.

3. The method of claim 1, wherein piercing the tube wall includes inserting the punches into the notches.

4. The method of claim 1, further comprising lowering and lifting the die prior to pulling the die out of the tube.

5. The method of claim 1, further comprising displacing material from the tube wall into the notches while the die is in the working position.

6. The method of claim 5, wherein displacing material from the tube wall includes forming inwardly directed collars surrounding the slots.

7. The method of claim 1, wherein the tube is stabilized against the two opposite supporting strips prior to rotating the die about its longitudinal axis and is no longer stabilized by the die after rotating the die about its longitudinal axis.

8. The method of claim 1, wherein stabilizing the tube from the inside against two opposite supporting strips of the die comprises establishing a linear contact between each of the supporting strips and the inner wall of the tube.

9. The method of claim 8, wherein the linear contact defines supporting lines extending approximately along a center of each of the two narrow sides.

10. The method of claim 1, wherein stabilizing the tube from the inside against two opposite supporting strips of the die comprises engaging the inner wall of the tube with rounded portions of the supporting strips, the rounded portions having a radius of curvature smaller than a radius of curvature of the tube in a region of the slots.

11. The method of claim 1, wherein pushing the die into the tube comprises filling less than 50% of a cross section of the tube with a cross section of the die.

12. The method of claim 1, further comprising locating the die within the tube such that a largest cross-sectional extent of the die is arranged approximately transversely to the slots prior to rotating the die about its longitudinal axis.

13. The method of claim 1, further comprising carrying out at least one additional movement of the die in the tube after rotating the die about its longitudinal axis and prior to pulling the die out of the tube.

14. The method of claim 13, wherein the additional movement is a lowering movement.

15. The method of claim 2, wherein rotating the die includes rotating the die through an angle of no more than 90 degrees.

16. The method of claim 1, wherein clasping the tube wall from the outside comprises embracing the tube between an upper tool and a lower tool.

17. The method of claim 1 wherein the die is a first die, further comprising:
   providing a second die having notches;
   pushing the second die into the tube;
   stabilizing the tube from the inside against two opposite supporting strips of the second die;
   rotating the second die about its longitudinal axis from a working position into a retracted position; and
   pulling the second die out of the tube.

18. The method of claim 17, wherein the first die is pushed into the tube and pulled from the tube from one of a left-hand side and a right-hand side of the tube, and wherein the second die is pushed into the tube and pulled from the tube from the other of the left-hand side and the right-hand side of the tube.

19. The method of claim 17, further comprising inserting a partition into the tube prior to pushing the first and second dies into the tube.

20. The method of claim 19, wherein the first die and the second die are pushed into the tube extending approximately to the partition.

* * * * *